US011952720B2

(12) United States Patent
Nyflött et al.

(10) Patent No.: US 11,952,720 B2
(45) Date of Patent: Apr. 9, 2024

(54) REPULPABLE PACKAGING MATERIAL

(71) Applicant: Stora Enso OYJ, Helsinki (FI)

(72) Inventors: Åsa Nyflött, Karlstad (SE); Chris Bonnerup, Floda (SE); Magnus Ekberg, Fors (SE)

(73) Assignee: Stora Enso OYJ, Helsinki (FI)

( * ) Notice: Subject to any disclaimer, the term of this patent is extended or adjusted under 35 U.S.C. 154(b) by 200 days.

(21) Appl. No.: 17/312,092

(22) PCT Filed: Dec. 9, 2019

(86) PCT No.: PCT/IB2019/060567
§ 371 (c)(1),
(2) Date: Jun. 9, 2021

(87) PCT Pub. No.: WO2020/121162
PCT Pub. Date: Jun. 18, 2020

(65) Prior Publication Data
US 2022/0025582 A1 Jan. 27, 2022

(30) Foreign Application Priority Data

Dec. 10, 2018 (SE) .................... 1851535-3

(51) Int. Cl.
*D21H 27/10* (2006.01)
*C09D 109/10* (2006.01)
*D21H 17/00* (2006.01)
*D21H 19/82* (2006.01)

(52) U.S. Cl.
CPC .......... *D21H 19/826* (2013.01); *C09D 109/10* (2013.01); *D21H 17/74* (2013.01); *D21H 27/10* (2013.01)

(58) Field of Classification Search
CPC ...... D21H 19/826; D21H 17/74; D21H 27/10; C09D 109/10
USPC ....................................... 162/170
See application file for complete search history.

(56) References Cited

U.S. PATENT DOCUMENTS

| 9,771,688 B2 | 9/2017 | Pang et al. |
| 2004/0241475 A1 | 12/2004 | Morabito |
| 2011/0262745 A1 | 10/2011 | Ronka |
| 2016/0348318 A1 | 12/2016 | Koenig et al. |

FOREIGN PATENT DOCUMENTS

| EP | 0855266 A1 | 7/1998 |
| EP | 2358942 A2 | 8/2011 |
| EP | 3363947 A1 | 8/2018 |
| JP | H11514595 | 12/1999 |
| JP | 2003154609 A | 5/2003 |
| WO | 2015155413 A1 | 10/2015 |
| WO | 2016195893 A1 | 12/2016 |
| WO | 2018116118 A1 | 6/2018 |

OTHER PUBLICATIONS

International Search Report from corresponding PCT application No. PCT/IB2019/060567 dated Mar. 16, 2020.

*Primary Examiner* — Mark Halpern
(74) *Attorney, Agent, or Firm* — Greer, Burns & Crain, Ltd.

(57) ABSTRACT

The invention relates to a heat-sealable packaging material comprising: a paperboard substrate comprising a first side and a second side, a first coating layer on the first side, a first barrier coating layer on the first coating layer, which first barrier coating layer comprises pigments, a second coating layer on the second side, and a second barrier coating layer on the second coating layer, which second barrier coating layer comprises pigments, wherein the coating layers and the barrier coating layers comprise a latex or a water-soluble polymer, wherein the first coating layer and the second coating layer are free of pigments, wherein the first barrier coating layer and the second barrier coating layer comprise pigments in an amount in a range from >40 wt % to <70 wt %, based on the dry solid content of the respective layer, and wherein the grammage of each of the first and second coating layer and of the first and second barrier coating layer is in a range from >1 g/m2 to <10 g/m2. The invention further relates to a method of manufacturing a respective packaging material and a packaging derived therefrom.

12 Claims, 1 Drawing Sheet

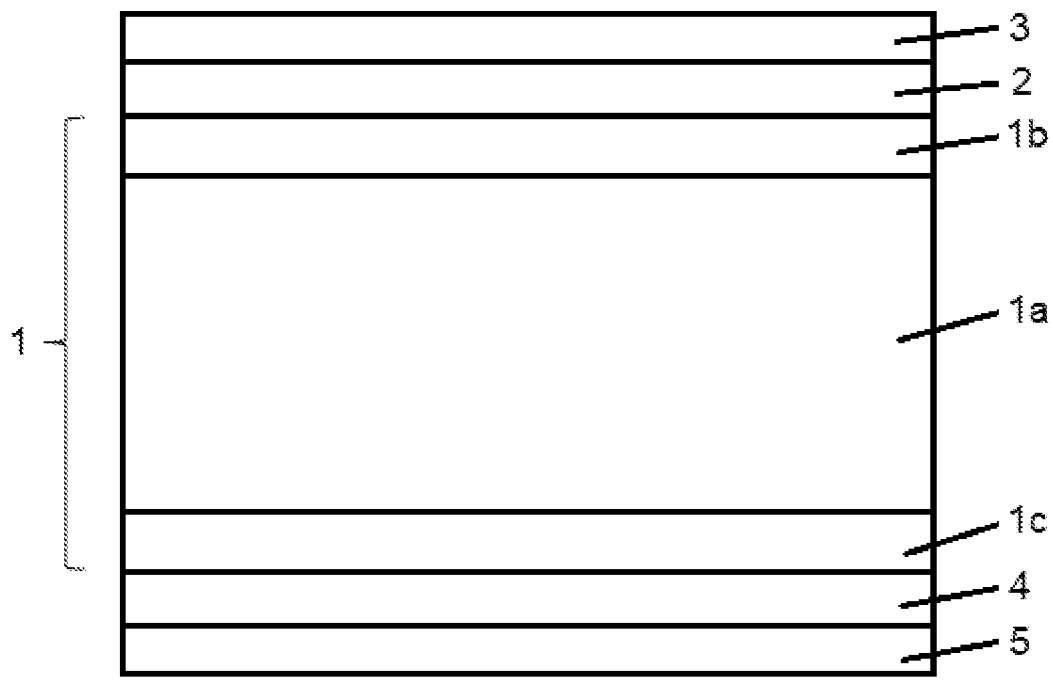

REPULPABLE PACKAGING MATERIAL

This application is a U.S. National Phase under 35 U.S.C. § 371 of International Application No. PCT/IB2019/060567, filed Dec. 9, 2019, which claims priority under 35 U.S.C. §§ 119 and 365 to Swedish Application No. 1851535-3, filed Dec. 10, 2018.

The present invention relates to packaging material for liquids or frozen food, and particularly to a repulpable packaging material.

Fiber based material used in packages or cups for liquids or frozen food is usually provided with barrier coatings both on the inside (facing the packed item) and on the outside (print-side). The barrier coating applied on the inside makes the material resistant against e.g. liquids, grease, oxygen and/or aroma and enables it to withstand the influence of the packed item on the packing material. The barrier coating should also be heat-sealable. The most commonly used materials when forming a barrier on a fiber based product are polyolefins, such as polyethylene (PE) or polypropylene (PP). Today, also bio-based versions thereof are used including other bio-based polymers such as polylactic acid (PLA). Liquid packaging board is usually provided with polymer coating on both sides and oftentimes with an additional aluminum foil on the inside. Packaging materials including several layers of polyolefins and aluminum foil are hard to re-pulp due to problems in separating the plastic coating from the paperboard.

Various packaging materials have been disclosed addressing the problems of recyclability while maintaining barrier properties. WO 2015/155413 discloses a coated food cardboard which comprises a cardboard layer and a coating layer on at least one side of it, wherein a barrier layer is arranged between the coating layer and the cardboard containing binder and slate-like mineral pigment. Also the coating layer comprises binder and light-refracting pigment or mixture of pigments. The teaching only refers to coatings containing pigment. U.S. Pat. No. 9,771,688 discloses a coated paperboard comprising a base coat and a top coat, each comprising binder and pigment. The teaching only refers to coatings containing pigment, which are coated to a first side of the paperboard. EP 2358942 discloses a recyclable coated paperboard coated with a first and second coating layer formed from an aqueous polymer dispersion, where each layer consist of from about 70 to about 90 wt % of polymer emulsion and 10 to about 30 wt % pigments. The teaching only refers to coatings containing pigment. WO 2018/116118 discloses a heat-sealable packaging material comprising a first and a second dispersion barrier layer on the print side, wherein the second dispersion barrier layer comprises pigments. The teaching however only refers to a coating of the print side of the paperboard.

Another challenge for cupboard makers is that the paperboard materials need to provide a certain stiffness. In order to provide desired stiffness, previous cupboard makers have traditionally increased the grammage of both the base board and the coatings, with increased consumption of raw materials.

Thus, there remains a need for a packaging material that is suitable for the manufacturing of cups, which are repulpable with high yield, provides the required barrier against moisture and liquid, and has a high stiffness and yet a low grammage.

This object is met with the packaging material, the method of manufacturing the packaging material, and the packaging according to the independent claims of the present invention. The dependent claims are related to preferred embodiments. They may be combined freely unless the context clearly indicates otherwise.

The invention provides a heat-sealable packaging material comprising:
- a paperboard substrate comprising a first side and a second side,
- a first coating layer on the first side,
- a first barrier coating layer on the first coating layer, which first barrier coating layer comprises pigments,
- a second coating layer on the second side, and
- a second barrier coating layer on the second coating layer, which second barrier coating layer comprises pigments,
- wherein the coating layers comprise a latex or a water-soluble polymer and the barrier coating layers comprise a latex,
- wherein the first coating layer and the second coating layer are free of pigments,
- wherein the first barrier coating layer and the second barrier coating layer comprise pigments in an amount in a range from ≥40 wt % to ≤70 wt %, based on the dry solid content of the respective layer, and wherein the grammage of each of the first and second coating layer and of the first and second barrier coating layer is in a range from ≥1 g/m$^2$ to ≤10 g/m$^2$.

The packaging material is heat-sealable and simultaneously provides good enough barrier properties against moisture and liquid, both on the inside and the outside, to be used for packaging of e.g. beverages or food, especially suitable for the production of cups. It has surprisingly been found that the packaging material with the symmetric layer arrangement according to the invention having pigment-free layers of latex or water-soluble polymers on both sides in direct contact with the base board and outer barrier layers comprising pigments within the stipulated ranges provides very good stiffness also at low grammages. This enables the production of low weight cup paperboard which still exhibits high stiffness. Without being bound to a specific theory, it is assumed that the use of latex or water-soluble polymer layers for the innermost layers on both sides, in addition to contribute to the high stiffness, also improves the heat sealability.

It is an important advantage that the barrier properties are preserved and that the packaging material is repulpable. Preferably, the first barrier coating layer forms a printing layer and the second barrier coating layer forms the inside of a thereof formed packaging and thus is to be in contact with the content of a thereof produced package or cup. No further barrier layers are needed. Particularly, the packaging material does not include a polyolefin layer on the outside/print side of the packaging. Correspondingly, the reject levels can be diminished and the reject level in the repulping of the packaging material or a packaging made thereof may be less than 12 wt % or less than 10 wt %, or even less than 7 wt %, based on the dry weight. The paperboard further fulfills the food safety legislations.

The advantages of the invention thus are achieved by observing several determinants for the first and second coating layers and barrier layers, e.g. both latex layers in direct contact with the base board comprise no pigments, while both barrier latex layers comprise high amounts of pigments, and all layers observe low grammage.

As used herein, "paperboard" refers to a paper based substrate of an amalgamation of fibers that can include, at least in part, vegetable, wood, and/or synthetic fibers. The paperboard substrate preferably comprises cellulosic fibers. A typical paperboard substrate used for packaging material comprises at least one ply, preferably several plies. The paperboard substrate is preferably a multilayer paperboard, comprising at least two layers of a back ply and a top ply. The paperboard substrate may further comprise one or several middle plies. The paperboard substrate for example may comprise a top ply and a back ply and a middle ply. A multilayer paperboard is particularly suitable for packaging liquids and/or frozen food. The grammage of a paper layer or coating layer refers to the weight expressed as grams per square meter, gsm or g/m². As used herein, gsm and g/m² may be used interchangeable.

As used herein, "barrier coating layer" refers to a coating layer providing barrier properties to the paperboard substrate by reducing or eliminating the permeability of gases such as oxygen through the material and/or the absorption of liquids in the fiber structure. The terms "barrier coating layer" and "barrier layer" are used interchangeable. Barrier coatings are required to prevent the egress of packaged products such as liquids, and to prevent the ingress into the package of oxygen, moisture, grease, oil or other contaminants that might deteriorate the quality of the packaged product. One barrier layer of the packaging material forms the printing layer and the other barrier layer is the layer being in contact with the content of a thereof produced cup/package. In this context, a "printing surface" is meant to define a surface adapted to be printed. The barrier layers thus form the outermost layers of the packaging material.

As used herein, "coating layer" refers to a layer that has preferably been brought by dispersion coating onto the paperboard substrate, which is well known in the prior art of coating of aqueous solutions and dispersions. As used herein, "dispersion coating" refers to a coating technique where latex, that is, an aqueous dispersion of fine polymer particles, is applied to the surface of a paper or paper board to form a solid, substantially non-porous film after drying. The dispersion layers may be applied by the use of roller coating, spray coating, curtain, blade coating, slot coating, immersion coating, gravure roll coating, reverse direct gravure coating, rod coating, soft-tip blade coating and/or combinations thereof. Preferred coating methods are blade coating and rod coating. Dispersion coatings can be recycled.

As used herein, "latex" refers to a polymer applied or coated from an aqueous suspension of polymer particles, which can be natural polymers, synthetic polymers, synthetic polymers derived from biomass, or combinations thereof.

As used herein, "pigment" refers to extenders, fillers and coatings such as clay, chalk or kaolin used for papermaking as usually referred to in the paper industry.

If not specifically denoted otherwise, given % are weight %, and are calculated on the basis of a dry weight of 100 weight % of the respective object, such as a layer, ply or packaging.

The bending resistance and the bending resistance index in machine direction (MD) and cross machine direction (CD), providing a measure of the stiffness, of the packaging material as expressed herein is measured in accordance with ISO2493-1, using a bending angle of 15 degrees.

The water absorption rate expressed herein is measured using COBB 600 in accordance with SCAN-P 12:64.

The present invention will be further described in connection with various embodiments and other aspects. They may be combined freely unless the context clearly indicates otherwise.

The paperboard substrate is preferably a multi-layer paperboard, comprising a top ply and a back ply and one or several middle plies, which middle plies provide bulk. Preferably, the paperboard substrate, also denoted base board, is a three-ply paperboard comprising a top ply, a middle ply and a back ply. The paperboard substrate may have a basis weight of about 150 gsm, preferably of about 200 gsm, or of about 300 gsm. A multilayer paperboard is particularly suitable for liquid and/or food packaging. The one or more middle plies can contain sulphate/kraft pulp and CTMP, which advantageously provide bulk. The pulp can be unbleached or bleached. The middle ply may comprise fibres originating from chemi-thermomechanical pulp (CTMP) or thermomechanical pulp (TMP). Preferably, the middle ply comprises sulphate pulp and CTMP. The top and back ply preferably comprise sulphate pulp. Top and back ply preferably will not comprise CTMP fibres. The first side of the paperboard may become the print side, while the second side may become the inside of a thereof formed packaging.

The base board may be surface sized. Particularly, the top ply and/or the back ply of the paperboard substrate may be untreated or surface sized, for example with a thin layer of starch, on one or both sides. Surface sizing is applied prior to the application of the coating layers. The surface sizing may comprise or consist of modified starches or comprise surface sizing agents such as acrylic co-polymers and pigments. Surface sizing further enhances the barrier properties of the dispersion coating.

In embodiments, the heat-sealable packaging material of the invention has a bending resistance index (determined according to ISO2493-1, 15ˆ) in machine direction (MD) of above 12 Nm6/kg3, preferably of above 13 Nm6/kg3 and/or a bending resistance index (determined according to ISO2493-1, 15ˆ) in cross direction (CD) of above 5 Nm6/kg3, preferably above 6 Nm6/kg3.

The packaging material of the invention may further exhibit a water absorption rate of below 15 g/m², preferably of below 13 g/m² and most preferably below 10 g/m² as measured using COBB 600 in accordance with SCAN-P 12:64

In embodiments, the heat-sealable packaging material may have a low grammage in a range from ≥150 g/m² to ≤230 g/m². In embodiments, the packaging material has a grammage in a range from ≥150 g/m² to ≤230 g/m² and a bending resistance (determined according to ISO2493-1, 15 degrees) in cross direction (CD) of above 60 mN, preferably above 65 mN or above 70 mN, and/or a bending resistance (determined according to ISO2493-1, 15 degrees) in machine direction (MD) of above 150 mN, preferably above 160 mN or above 165 mN. The heat-sealable packaging material thus enables a high stiffness at very low grammage.

In other embodiments, the heat-sealable packaging material may have a grammage above 230 g/m², such as in a range from ≥230 g/m² to ≤400 g/m², or from ≥200 g/m² to ≤360 g/m². In embodiments, the packaging material has a grammage in a range from ≥200 g/m² to ≤400 g/m², or from ≥200 g/m² to ≤360 g/m², and a bending resistance (determined according to ISO2493-1, 15 degrees) in cross direction (CD) of above 75 mN, preferably above 120 mN or above 125 mN, and/or a bending resistance (determined according to ISO2493-1, 15 degrees) in machine direction (MD) of above 190 mN, preferably above 250 mN or above 270 mN. Also in these embodiments, the heat-sealable packaging material provides a high stiffness at low grammage.

The grammage of each of the first and second coating layers and of the first and second barrier coating layers is in a range from ≥1 g/m² to ≤10 g/m². This provides for that the grammage or coat weight of the layers equal or below 40 g/m². The first coating layer, the second coating layer, the first barrier coating layer and/or the second barrier coating layer independently may have a grammage in a range from $\geq 5$ g/m² to $\leq 10$ g/m². In embodiments, the first and second coating layer and the first and second barrier coating layer each have a grammage in a range from $\geq 5$ g/m² to $\leq 10$ g/m². The packaging material advantageously provides a very low coat weight, while at the same time providing good barrier properties. In embodiments, the first and second coating layer and the first and second barrier coating layer together have a grammage or coat weight in a range from $\geq 20$ g/m² to $\leq 40$ g/m², preferably in a range from $\geq 25$ g/m² to $\leq 35$ g/m².

The first and the second coating layer comprise no pigments. It is assumed that it is crucial for providing very good stiffness at low grammages that the symmetric structure provides a latex or a water-soluble polymer layer without pigments on both sides in direct contact with the paperboard. The first and the second coating layer preferably comprise a high amount of latex or a water-soluble polymer. The water-soluble polymer in the first and second coating layer may be selected from the group comprising starch and polyvinyl alcohol (PVOH).

In a preferred embodiment, the first and second coating layer comprise latex. In embodiments, the first coating layer and the second coating layer each comprise latex in an amount in a range from $\geq 90$ wt % to $\leq 100$ wt %, based on the dry solid content of the layer. The latex in the first and second coating layer and/or the first and second barrier layer may be selected from the group comprising styrene-butadiene latex, styrene-acrylate latex, acrylate latex, vinyl acetate latex, vinyl acetate-acrylate latex, styrene-butadiene-acrylonitrile latex, styrene-acrylate-acrylonitrile latex, styrene-butadiene-acrylate-acrylonitrile latex, styrene-maleic anhydride latex, styrene-acrylate-maleic anhydride latex, or mixture of these latexes. The latex is preferably a styrene-butadiene (SB) latex or a styrene-acrylate (SA) latex, or a mixture of these latexes. The latex can be biobased, i.e. derived from biomass, such as biobased styrene-acrylate or styrene-butadiene latex. Biobased latex can provide similar performance, and provides improved carbon footprint. Latexes in the first and second coating layer and/or the first and second barrier layer may be the same, or different latexes can be used for the respective layers. In embodiments, the latex in the first and second coating layer and/or the first and second barrier coating layer is selected from styrene-butadiene (SB) latex, styrene-acrylate (SA) latex, or a mixture thereof.

For the barrier properties and stiffness of the packaging material the latex used in the coating layers may have an identical or higher or lower glass transition temperature than the latex in the barrier layers. The glass transition temperature of the latex in the barrier layers may be higher than the glass transition temperature of the latex in the coating layers, but this is not crucial for the effects of good stiffness also at low grammages of the symmetric layer arrangement.

Preferably, the first and the second coating layer may comprise latex as the only binder. The first and the second coating layer in other embodiments may comprise latex as the main binder and one or more co-binders, preferably in small amounts. Co-binders may be selected from starch, carboxymethyl cellulose (CMC), alkali-swellable thickeners, or polyvinyl alcohol (PVOH). Such co-binders may control the viscosity and water retention. A preferred co-binder is PVOH. In embodiments, the first coating layer and the second coating layer each comprise latex as the main-binder and a co-binder in a range from $\geq 0$ wt % to $\leq 5$ wt %, based on the dry solid content of the layer, preferably of polyvinyl alcohol (PVOH). Preferably, the coating layers comprise co-binders such as PVOH in a range from $\geq 0$ wt % to $<1$ wt %, based on the dry solid content of the layer.

The first and the second coating layer may comprise additives such as additives selected from the group of rheology modifiers, defoamers, antifoaming agents, pH adjustment additives, cross linkers, thickening agents, dispersing aids, slip additives, fillers, release agents, preservatives and antiblocking agents. The first and the second coating layer may comprise additives in a range from $\geq 0$ wt % to $\leq 5$ wt %, based on the dry solid content of the layer.

The coating layers provide inner latex or water-soluble polymer layers of the packaging material, contacting the paperboard on one side and the barrier layers on the other side, while the barrier layers provide the outer layers of the layer arrangement. The first barrier layers may form the print side and the second barrier layer the inside of a thereof formed packaging. Preferably, the second barrier layer is in direct contact with the content of the package. Advantageously, no further barrier layer is needed.

The inner coating layers are free of pigments, while the outer barrier layers are the only layers comprising pigments. The first and second barrier layers particularly comprise a high amount of pigments. Pigments may improve the barrier properties. The high amount of pigments in the barrier layers enables an efficient barrier at a low coat weight. It also facilitates the repulpability. A barrier layer comprising latex and a high amount of pigments applied on the print side of a packaging material may provide properties suitable for printing. A barrier layer comprising latex and a high amount of pigments applied on the inside of a packaging material may serve as a sufficiently efficient barrier against a liquid and/or frozen contents of a container formed therefrom. In embodiments, the first barrier coating layer and the second barrier coating layer each comprise pigments in an amount in a range from $\geq 40$ wt % to $\leq 70$ wt %, preferably $\geq 50$ wt % to $\leq 70$ wt % or in an amount in a range from $\geq 55$ wt % to $\leq 70$ wt %, based on the dry solid content of the layer. In embodiments, the pigments are selected from the group comprising clay, talc, calcium carbonate and/or nanoclay. Preferably, the clay is kaolin clay. The term nanoclay refers to nanoscale clay pigments. Preferably, the pigment is a plate-like pigment, such as a plate-like clay pigment.

In view of the amount of pigment, the barrier layers comprise a lesser amount of latex compared to the pigment-free coating layers. In embodiments, the first barrier coating layer and the second barrier coating layer each comprise latex in an amount in a range from $\geq 30$ wt % to $\leq 60$ wt %, based on the dry solid content of the layer.

In addition to latex and pigments, the first and the second barrier layers may comprise additives. Additives may be selected from the group of rheology modifiers, defoamers, antifoaming agents, pH adjustment additives, cross linkers, thickening agents, dispersing aids, slip additives, fillers, release agents, preservatives and antiblocking agents. The first and the second barrier layer may comprise additives in a range from $\geq 0$ wt % to $\leq 5$ wt %, based on the dry solid content of the layer.

The packaging material or a packaging comprising or being made from the packaging material may be recycled into other paper products using common repulping technology. In the repulping the cellulose fibers are separated, and after cleaning are recyclable. The unrepulped fraction is referred to as rejects. Rejects can comprise agglomerated fibers and any solid foreign material. Rejects have to be removed for disposal or burning. In preferred embodiments, the reject received from the repulping of the packaging material is less than 12 wt % or less than 10 wt %, preferably less than 7 wt % more preferably less than 5 wt %, based on a dry weight of the packaging material of 100 weight %, the reject being determined according to PTS test method RH021/97. The packaging material thus provides very good repulpability. The packaging material thus may be referred to as a repulpable packaging material.

The invention further relates to a method of manufacturing a packaging material, the method comprising the steps of:
 providing a paperboard substrate comprising a first side and a second side,
 applying first coating layer on the first side,
 applying first barrier coating layer on the first coating layer, which first barrier coating layer comprises pigments,
 applying second coating layer on the second side, and
 applying a second barrier coating layer on the second coating layer, which second barrier coating layer comprises pigments,
 wherein the coating layers are formed by dispersion coating of a latex or a water-soluble polymer and the barrier layers are formed by dispersion coating of a latex, characterized in that the first coating layer and the second coating layer are free of pigments, wherein the first barrier coating layer and the second barrier coating layer comprise pigments in an amount in a range from ≥40 wt % to ≤70 wt %, based on the dry solid content of the respective layer, and wherein the grammage of each of the first and second coating layer and of the first and second barrier coating layer is in a range from ≥1 g/m$^2$ to ≤10 g/m$^2$.

The dispersion layers may be applied by the use of roller coating, spray coating, curtain, blade coating, slot coating, immersion coating, gravure roll coating, reverse direct gravure coating, rod coating, soft-tip blade coating and/or combinations thereof. A preferred coating method is selected from blade coating and rod coating. The method is usable for manufacturing a heat-sealable packaging material as described above.

The invention makes it possible increase the productivity of barrier material by using high speed coaters without problems.

The invention further relates to a packaging comprising or being made from the packaging material as described above. The packaging is preferably made by use of heat-sealing of the packaging material as described above. The packaging is particularly usable as container for liquid content, such as liquid food or beverages, and/or frozen food.

Since the packaging material preferably comprises no polyolefin layer or metal layer such as aluminum foil repulpability is much facilitated. In embodiments, the reject received from the repulping of the packaging is less than 12 wt % or less than 10 wt %, preferably less than 7 wt % more preferably less than 5 wt %, based on a dry weight of the packaging material of 100 weight %, the reject being determined according to PTS test method RH021/97.

The packaging is particularly usable for liquids and/or frozen liquid food. In embodiments, the packaging is a beverage container, preferably a cup. The packaging may be used as a disposable drinking cup. Since the packaging material preferably comprises no polyolefin layer or metal layer such as aluminum foil, the packaging may be usable as a biodegradable paper-based cup.

Further features of the present invention will become apparent from the example and FIGURE, wherein:

FIG. 1 is a schematic drawing of a packaging material according to an embodiment of the invention.

The packaging material shown in FIG. 1 comprises a paperboard substrate 1, comprising three plies, a middle ply 1a, a top ply 1b, and a back ply 1c. The middle layer 1a contains CTMP and sulphate pulp. The top ply 1b and the back ply 1c comprise sulphate pulp. The paperboard substrate comprises a first side and a second side, wherein the top ply 1b is arranged on first side and the back ply 1c on the second side. The first side refers to the print side of a packaging such as a container made from the heat-sealable packaging material, while the second side refers to the inside of such a container. On the first side the packaging material, the top ply 1b is coated with a first coating layer 2. On the second side the back ply 1c is coated with a second coating layer 4. The first coating layer 2 and the second coating layer 4 are free of pigments. A first barrier coating layer 3 is arranged on the first coating layer 2. The first barrier coating layer 3 forms the printing surface of the packaging material. The packaging material may be printed directly on the barrier coating layer 3. A second barrier coating layer 5 is arranged on the second coating layer 4. The second barrier coating layer 5 will be in contact with the content of a container produced from the packaging material. While the first coating layer 2 and the second coating layer 4 are free of pigments, the first barrier coating layer 3 and the second barrier coating layer 5 comprise pigments in an amount in a range from ≥40 wt % to ≤70 wt %, based on the dry solid content. The first and second coating layers 2 and 4 and the first and second barrier coating layers 3 and 5 comprise a latex, preferably selected from styrene-butadiene latex, styrene-acrylate latex, or a mixture thereof. The coating layers 2 and 4 and barrier coating layers 3 and 5 are applied by dispersion coating onto the paperboard substrate. The grammage of each of the first and second coating layers and of the first and second barrier coating layers is in a range from ≥1 g/m$^2$ to ≤10 g/m$^2$. The material as shown in FIG. 1 is particularly suitable for the manufacture of heat-sealed product packages for liquids such as disposable cups.

EXAMPLE 1

In order to evaluate the packaging material of the invention, a test series was performed in which the barrier properties and the stiffness of packaging material manufactured in accordance with the invention was evaluated in a laboratory trial using a rod coater.

Coating compositions (Dispersion 1, dispersion 2 and Ref 1) were prepared according to the table 1. All percentages calculated as dry solid content (wt %).

TABLE 1

| Raw material | Dispersion 1 [wt %] | Dispersion 2 [wt %] |
|---|---|---|
| Styrene acrylate latex | 100 | 40.6 |
| Clay pigment | | 58.1 |
| Dispersion agent | | 0.1 |
| NaOH | | 0.1 |
| PVOH | | 0.3 |
| Crosslinker | | 0.3 |
| Defoamer | | 0.4 |
| Thickener | | 0.1 |

The coating compositions were coated by use of a rod coater on paperboard Cupforma Natura, of different grammages from 184 to 295 gsm, which is a three-layer paperboard with two outer layers made of bleached kraft pulps and a middle layer comprising bleached kraft pulp and CTMP. The dispersion 1 were coated on both sides of the paperboard to form first, innermost coatings, at an amount of 10 gsm on each side, whereupon the dispersion 2 were coated on both sides of the paperboard onto said first inner coatings at an amount of 5 gsm on each side. The thereof prepared packaging material samples (sample 1-4) had thus the following structure:

dispersion 2/dispersion 1/Cupforma Natura/dispersion 1/dispersion 2

As a reference, coating compositions (Ref 1 and Ref 2) were prepared in accordance with table 2. A reference sample (Ref Board) was prepared by coating Cupforma Natura 195 g/m² with said reference coating compositions to form the following structure:

Ref 2, 5 gsm/Ref 1, 10 gsm/Cupforma Natura/Ref 1, 10 gsm/Dispersion 2, 5 gsm

TABLE 2

| Raw material [pph] | Ref 1% | Ref 2% |
|---|---|---|
| SA latex 1 | 35.6 | |
| SA latex 2 | 35.6 | 40.7 |
| Rheology modifier | 0.3 | |
| Calcium Carbonate | 28.4 | 46.5 |
| NaOH | 0.1 | 0.1 |
| Clay pigment | | 11.6 |
| Disp. Agent | | 0.1 |
| PVA | | 0.3 |
| Crosslinker | | 0.3 |
| Defoamer | | 0.4 |

The properties of the packaging materials of the invention and the reference board are summarized in table 3.

As can be seen in table 3, the packaging materials made in accordance with the invention shows a low water absorption and a high stiffness. The reject level (PTS) for Sample 1-4 was between 10-11%.

TABLE 3

| | Sample 1 | Sample 2 | Sample 3 | Sample 4 | Ref Board |
|---|---|---|---|---|---|
| Grammage [g/m²] | 226 | 244 | 290 | 320 | 240 |
| Bending resistance 15°, MD | 165 | 196 | 330 | 466 | 158 |
| Bending resistance index 15° MD | 14.3 | 13.5 | 13.5 | 14.2 | 11.4 |
| Bending resistance 15°, CD | 71 | 76 | 149 | 236 | 65 |
| Bending resistance index 15° CD | 6.2 | 5.2 | 6.1 | 7.2 | 4.7 |
| Cobb600 RS [g/m2] | 1.9 | 8 | 11 | 4.5 | 20 |

The invention claimed is:

1. A heat-sealable packaging material comprising:
   a paperboard substrate comprising a first side and a second side,
   a first coating layer on the first side,
   a first barrier coating layer on the first coating layer, the first barrier coating layer comprising pigments,
   a second coating layer on the second side, and
   a second barrier coating layer on the second coating layer, the second barrier coating layer comprising pigments,
   wherein the first and second coating layers comprise a latex or a water-soluble polymer and the first and second barrier coating layers comprise a latex,
   wherein the first coating layer and the second coating layer are free of pigments,
   wherein the first barrier coating layer and the second barrier coating layer comprise pigments in an amount in a range from $\geq 40$ wt % to $\leq 70$ wt %, based on a dry solid content of the respective barrier coating layer, and latex in an amount in a range from $\geq 30$ wt % to $\leq 60$ wt %, based on the dry solid content of the respective barrier coating layer, and
   wherein a grammage of each of the first and second coating layer and of the first and second barrier coating layer is in a range from $\geq 1$ g/m² to $\leq 10$ g/m².

2. The heat-sealable packaging material according to claim 1, wherein the packaging material has a bending resistance index, 15 degrees (determined according to ISO2493-1) in machine direction (MD) of above 12 Nm⁶/kg³ and, 15 degrees (determined according to ISO2493-1) in cross direction (CD) of above 5 Nm⁶/kg³.

3. The heat-sealable packaging material according to claim 1, wherein the heat-sealable packaging material comprises a water absorption rate of below 15 g/m² as measured using COBB 600 in accordance with SCAN-P 12:64.

4. The heat-sealable packaging material according to claim 1, wherein the first and second coating layer and the first and second barrier coating layer each have a grammage in a range from $\geq 5$ g/m² to $<10$ g/m².

5. The heat-sealable packaging material according to claim 1, wherein the first and second coating layer together have a coat weight in a range from $\geq 20$ g/m² to $\leq 40$ g/m² and the first and second barrier coating layer together have a coat weight in a range from $\geq 20$ g/m² to $\leq 40$ g/m².

6. The heat-sealable packaging material according to claim 1, wherein the first coating layer and the second coating layer comprise latex in an amount in a range from $\geq 90$ wt % to $\leq 100$ wt %, based on the dry solid content of the respective coating layer.

7. The heat-sealable packaging material according to claim 6, wherein the first coating layer and the second coating layer further comprise a co-binder in a range from $\geq 0$ wt % to $\leq 5$ wt %, based on the dry solid content of the respective coating layer.

8. The heat-sealable packaging material according to claim 7, wherein the co-binder comprises polyvinyl alcohol (PVOH).

9. The heat-sealable packaging material according to claim 1, wherein the first barrier coating layer and the second barrier coating layer comprise pigments in an amount in a range from $\geq 50$ wt % to $\leq 70$ wt %, based on the dry solid content of the respective barrier coating layer.

10. The heat-sealable packaging material according to claim 1, wherein the pigments are selected from a group consisting of: clay, talc, calcium carbonate, nanoclay, and mixtures thereof.

11. The heat-sealable packaging material according to claim 1, wherein the latex in the first and second coating layer, or the first and second barrier coating layer, or both the first and second coating layer and the first and second barrier coating layer is selected from a group consisting of: styrene-butadiene latex, styrene-acrylate latex, and a mixture thereof.

12. A packaging comprising or being made from the heat-sealable packaging material according to claim 1.

* * * * *

UNITED STATES PATENT AND TRADEMARK OFFICE
CERTIFICATE OF CORRECTION

| | | |
|---|---|---|
| PATENT NO. | : 11,952,720 B2 | Page 1 of 1 |
| APPLICATION NO. | : 17/312092 | |
| DATED | : April 9, 2024 | |
| INVENTOR(S) | : Åsa Nyflött, Chris Bonnerup and Magnus Ekberg | |

It is certified that error appears in the above-identified patent and that said Letters Patent is hereby corrected as shown below:

In the Claims

Claim 4, Column 10, Line 28 should read:
"...in a range from $\geq 5$ $g/m^2$ to $\leq 10$ $g/m^2$..."

Signed and Sealed this
Second Day of July, 2024

*Katherine Kelly Vidal*

Katherine Kelly Vidal
*Director of the United States Patent and Trademark Office*